J. W. COCHRAN.

Car-Axle Box.

No. 20,406.

Patented June 1, 1858.

UNITED STATES PATENT OFFICE.

JNO. W. COCHRAN, OF NEW YORK, N. Y.

LUBRICATING CAR-AXLES.

Specification of Letters Patent No. 20,406, dated June 1, 1858.

*To all whom it may concern:*

Be it known that I, JOHN W. COCHRAN, of the city, county, and State of New York, have invented a certain Improvement in Lubricating Car-Axles; and I do hereby declare that the following is a full and exact description thereof, reference being had to accompanying drawings, and to the letters of reference marked thereon, in which—

Figure 1:
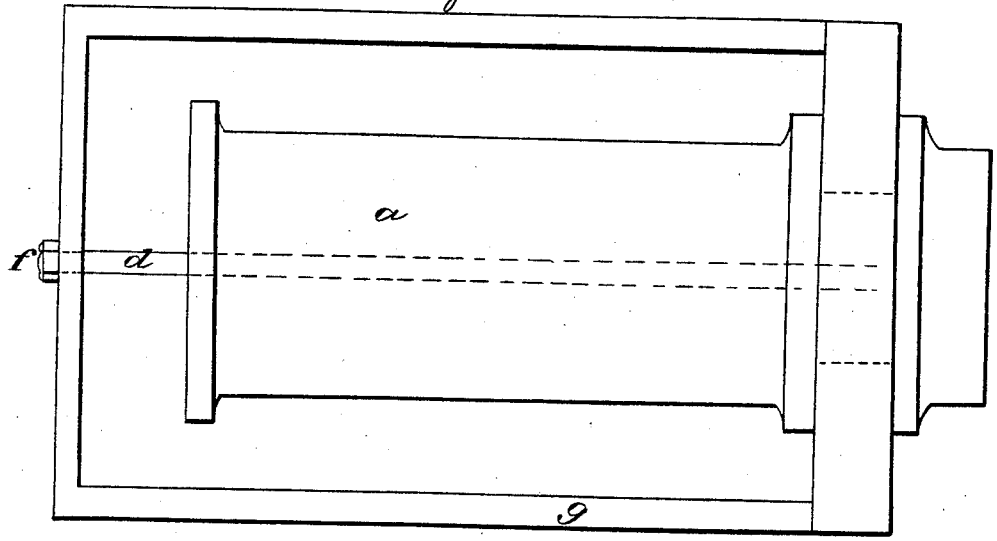
Figure 2:
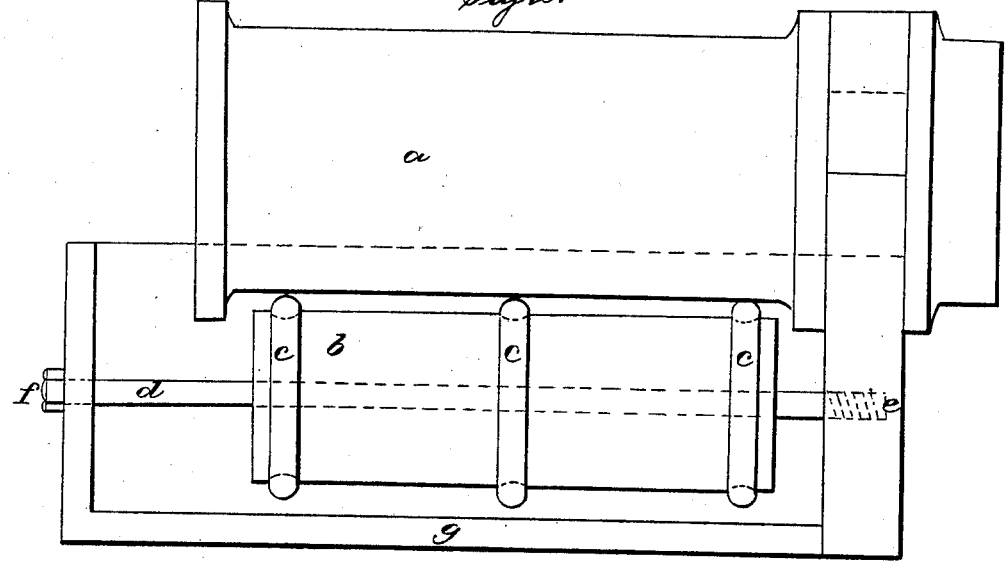

Figure 1, is a plan, and Fig. 2 a side view with one side of the box removed, showing the position of the lubricating means within the box.

To enable others skilled in the art to make and use my invention I will proceed to describe its construction and operation.

In the usual box of the axle, which is indicated in both figures of the drawings by the letter ($g$) I place a roller ($b$) which, by a rod ($d$) screwed in at one end ($e$) and secured by a nut at the other end ($f$), is held below the axle ($a$). Into grooves or recesses upon the roller ($b$) I place one or more rings or collars ($c$), which may cover only a small part of the surface of the roller or extend over nearly, if not quite the whole of its surface. These rings or collars I prefer to make of gutta-percha, but they may be made of india rubber, or of elastic cloth made into a roll, or of compounds of rubber and percha or of the gums and cloth, or of any elastic material; and also may be made tubular or solid. If made tubular the air contained within them will serve to give further elasticity to each ring. When these rings are placed upon the roller, their peripheries being suitably in contact with the surface of the axle or journal, it will be perceived that, rotation of the axle will give free and full rotation of the roller and the rings; the rings serving to conduct the oil to the surface of the journal and also to give an elastic bearing between the journal and the roller. The ring will be both a spring and a lubricating conductor. The pressure of the journal upon these rings, it will be noticed is directly vertical, and consequently the resistance offered by the rings is at all times of the same degree of elasticity, as each ring presents at every point in rotation the same amount of elastic substance as a bearing.

Having thus fully described the construction and operation of my invention, what I claim as new and desire to secure by Letters Patent is—

The elastic rings ($c$) upon the roller ($b$), serving the double purpose of elastic bearing and oil conductors as herein set forth.

13 April 1858.

J. W. COCHRAN.

Witnesses:
 JNO. JOHNSON,
 T. T. EVERETT.